United States Patent
Lan et al.

(10) Patent No.: US 10,486,810 B2
(45) Date of Patent: Nov. 26, 2019

(54) UNMANNED AERIAL VEHICLE

(71) Applicants: INVENTEC APPLIANCES (PUDONG) CORPORATION, Shanghai (CN); INVENTEC APPLIANCES CORP., New Taipei (TW); Inventec Appliances (Shanghai) Co. Ltd., Shanghai (CN)

(72) Inventors: De-Zheng Lan, Shanghai (CN); Shih-Chin Tseng, Shanghai (CN); Shih-Kuang Tsai, Shanghai (CN)

(73) Assignees: INVENTEC APPLIANCES (PUDONG) CORPORATION, Shanghai (CN); INVENTEC APPLIANCES CORP., New Taipei (TW); INVENTEC APPLIANCES (SHANGHAI) CO. LTD., Shanghai (CN)

( * ) Notice: Subject to any disclaimer, the term of this patent is extended or adjusted under 35 U.S.C. 154(b) by 355 days.

(21) Appl. No.: 15/425,066

(22) Filed: Feb. 6, 2017

(65) Prior Publication Data

US 2018/0057164 A1 Mar. 1, 2018

(30) Foreign Application Priority Data

Aug. 29, 2016 (CN) .......................... 2016 1 0755038

(51) Int. Cl.
*B64C 39/02* (2006.01)
*B64C 15/02* (2006.01)
(Continued)

(52) U.S. Cl.
CPC ............ *B64C 39/024* (2013.01); *B64C 15/02* (2013.01); *B64D 27/24* (2013.01); *B64D 33/04* (2013.01);
(Continued)

(58) Field of Classification Search
CPC . B64C 39/024; B64C 15/02; B64C 2201/027; B64C 2201/10;
(Continued)

(56) References Cited

U.S. PATENT DOCUMENTS 2,690,809 A * 10/1954 Kerry .................... B64C 23/005
416/22
2,927,746 A * 3/1960 Mellen .................. B64C 39/064
180/117

(Continued)

*Primary Examiner* — Valentina Xavier
(74) *Attorney, Agent, or Firm* — McClure, Qualey & Rodack, LLP

(57) ABSTRACT

An unmanned aerial vehicle (UAV) including a vehicle body and an airflow thruster is provided. The vehicle body has a center hub, an airflow guiding structure and an outer circumferential portion. An interior of the airflow guiding structure is interconnected between the center hub and the outer circumferential portion. The center hub has an airflow inlet. The outer circumferential portion has a plurality of lateral guiding outlets facing downward and corresponding to a gravity direction of the gravity direction of the unmanned aerial vehicle. The airflow thruster is disposed inside the center hub for generating a plurality of jet streams, such that the jet streams flow to the lateral guiding outlets through the airflow guiding structure to generate a propulsion.

14 Claims, 7 Drawing Sheets

(51) Int. Cl.
*B64D 27/24* (2006.01)
*B64D 33/04* (2006.01)
*F02K 1/15* (2006.01)
*F04D 25/06* (2006.01)
*F04D 29/28* (2006.01)

(52) U.S. Cl.
CPC .......... *F02K 1/15* (2013.01); *B64C 2201/042* (2013.01); *B64C 2201/108* (2013.01); *B64C 2201/162* (2013.01); *F04D 25/06* (2013.01); *F04D 29/284* (2013.01); *F05D 2240/90* (2013.01)

(58) Field of Classification Search
CPC ........ B64C 2201/108; B64C 2201/042; B64C 2201/162; B64D 27/24; B64D 33/04; F02K 1/15; F05D 2240/90; F04D 25/06; F04D 29/284
See application file for complete search history.

(56) References Cited

U.S. PATENT DOCUMENTS

| | | | | |
|---|---|---|---|---|
| 3,224,711 A * | 12/1965 | Warren | ................. | B64C 39/001 244/23 C |
| 3,276,723 A * | 10/1966 | Miller | ................. | B64C 29/0025 244/12.2 |
| 3,697,020 A * | 10/1972 | Thompson | ............ | B64C 39/001 244/12.2 |
| 3,915,411 A * | 10/1975 | Surbaugh | ................ | B64C 29/00 244/12.2 |
| 4,807,830 A * | 2/1989 | Horton | .................. | B64C 39/001 244/12.2 |
| 5,170,963 A * | 12/1992 | Beck, Jr. | ................ | B64C 39/064 244/12.2 |
| 6,050,520 A * | 4/2000 | Kirla | ....................... | B64C 29/00 244/10 |
| 6,572,053 B2 * | 6/2003 | Salas | ........................ | B60V 1/02 244/12.2 |
| 6,588,701 B2 * | 7/2003 | Yavnai | ................. | G05D 1/0038 244/12.1 |
| 6,616,094 B2 * | 9/2003 | Illingworth | ........... | B64C 11/001 244/12.1 |
| 7,971,823 B2 * | 7/2011 | Martin | .................... | B64C 17/06 244/12.2 |
| 8,302,901 B2 * | 11/2012 | Hatton | .................. | B64C 39/064 244/12.2 |
| 9,045,227 B1 * | 6/2015 | Gramling | ............... | B64C 39/064 |
| 2003/0127559 A1 * | 7/2003 | Walmsley | ............... | B64C 27/20 244/23 C |
| 2010/0051754 A1 * | 3/2010 | Davidson | ............... | B64C 17/06 244/23 C |
| 2018/0208304 A1 * | 7/2018 | Vedamanikam | .... | B64C 29/0016 |

* cited by examiner

UNMANNED AERIAL VEHICLE

This application claims the benefit of People's Republic of China application Serial No. 201610755038.9, filed Aug. 29, 2016, the disclosure of which is incorporated by reference herein in its entirety.

TECHNICAL FIELD

The disclosure relates in general to an aircraft, and more particularly to an unmanned aerial vehicle.

BACKGROUND

In recent years, unmanned aerial vehicle (UAV) has received people's attention and has been widely reported. Apart from the use of aerial photography, the unmanned aerial vehicle can further be used in the fields such as disaster relief, exploration, and delivery. As the price of the unmanned aerial vehicle is getting lower and lower, the quantity of users increases, and is getting more and more popular in entertainment and commercial applications. Therefore, the booming market trend of the unmanned aerial vehicle is unstoppable.

Recently, several events of unmanned aerial vehicle unexpectedly dropping off and causing harm to people are reported. Therefore, the safety problem caused by the unmanned aerial vehicle needs to be resolved as early as possible, and how to reduce the weight of vehicle body and the quantity of rotors has become a focus in the research and development of the unmanned aerial vehicle.

SUMMARY

The disclosure is directed to an unmanned aerial vehicle, which generates a plurality of jet streams to control the unmanned aerial vehicle. The jet streams generated by the central airflow are used as a power source of the unmanned aerial vehicle.

According to one embodiment, an unmanned aerial vehicle is provided. The unmanned aerial vehicle includes a vehicle body and an airflow thruster. The vehicle body has a center hub, an airflow guiding structure and an outer circumferential portion. An interior of the airflow guiding structure is interconnected between the center hub and the outer circumferential portion. The center hub has an airflow inlet. The outer circumferential portion has a plurality of lateral guiding outlets facing downward and corresponding to a gravity direction of the unmanned aerial vehicle. The airflow thruster is disposed inside the center hub for generating a plurality of jet streams which flow to the lateral guiding outlets through the airflow guiding structure to generate a propulsion.

The above and other aspects of the invention will become better understood with regard to the following detailed description of the preferred but non-limiting embodiment(s). The following description is made with reference to the accompanying drawings.

BRIEF DESCRIPTION OF THE DRAWINGS

FIG. 4-1 is a cross-sectional view of the airflow guiding structure of the unmanned aerial vehicle according to another embodiment.

DETAILED DESCRIPTION

Figure 1:
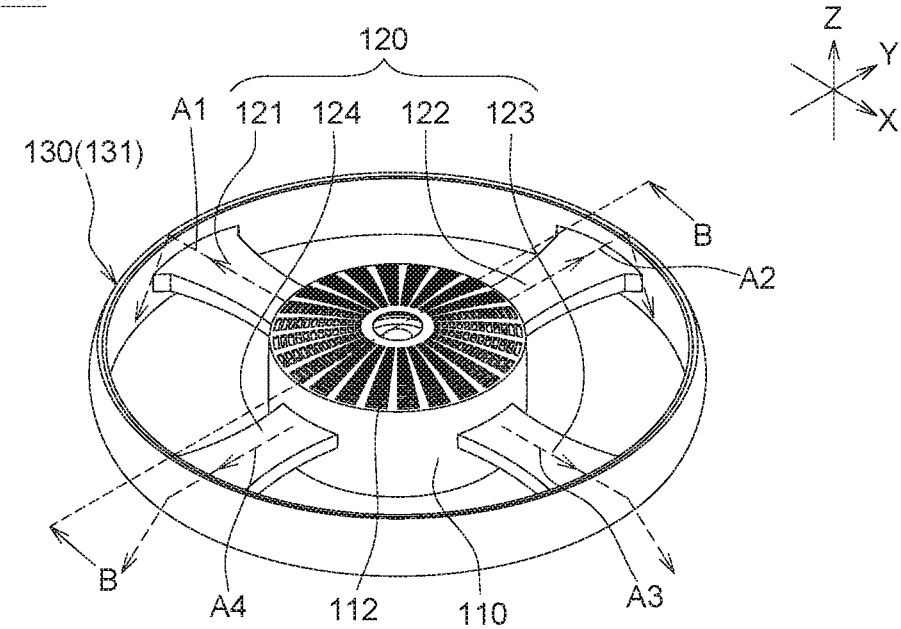
FIG. 1 is an external view of an unmanned aerial vehicle according to an embodiment of the invention.

In an embodiment of the invention, an unmanned aerial vehicle capable of generating a plurality of jet streams for controlling the flight direction is provided. In the unmanned aerial vehicle of the present embodiment, only one airflow thruster is disposed at the center of the vehicle body, such that the vanes or rotors will not be exposed outside the vehicle body. Conventional four-rotor UAV has four rotors and four motors, and therefore is heavier than the unmanned aerial vehicle of the invention. Furthermore, the four rotors of the conventional four-rotor UAV are exposed outside the vehicle body and are more likely to cause harm to the people or objects in the vicinity thereof. In comparison to the conventional four-rotor UAV, the unmanned aerial vehicle of the invention has higher security and can avoid causing damage to the people when the rotors rotate at a high speed.

In an embodiment of the invention, the propulsions of the jet streams in the outlet direction can be equivalent to or different from each other. Suppose the propulsion of the jet streams in the outlet directions are equivalent to each other. When the propulsion of the jet streams is greater than the gravity of the unmanned aerial vehicle, the unmanned aerial vehicle ascends; when the propulsion of the jet streams is smaller than the gravity of the unmanned aerial vehicle, the unmanned aerial vehicle descends; when the propulsion of the jet streams is equivalent to the gravity of the unmanned aerial vehicle, the unmanned aerial vehicle hovers.

In an embodiment of the invention, the quantity of jet streams is equivalent to an integer or an even number greater than 1. For example, the quantity of jet streams can be two, three, four, six or eight, and the invention is not limited thereto. By adjusting the volume of the airflow passing through each of the channels, the airflow controllers can control the propulsion generated by the airflow at each channel outlet. The airflow controller can be realized by an electronic valve or a controller having an electronic valve. In an embodiment, the propulsion of the jet streams in each channel can be obtained by calculating the volume of the airflow passing through each of the channels per time unit.

Besides, in an embodiment of the invention, the jet streams can generate a first oblique stream and a second oblique stream having different directions through the outlet by the airflow guiding elements disposed (such as guiding groove, orifice plate, grille or rib plate) at the channels outlets with different directions. For example, when the propulsion generated by the first oblique stream is greater than the propulsion generated by the second oblique stream, the unmanned aerial vehicle rotates along a first rotation direction; when the propulsion generated by the second oblique stream is greater than the propulsion generated by the first oblique stream, the unmanned aerial vehicle rotates along a second rotation direction inverse to the first rotation direction; when the propulsion generated by the first oblique stream is equivalent to the propulsion generated by the second oblique stream, the unmanned aerial vehicle does not rotate.

Under the circumstance that the propulsions of jet streams in the outlet directions are not equivalent to each other, the unmanned aerial vehicle can horizontally move to the left or to the right by adjusting the volume of the airflow of some jet streams to be smaller than the volume of the airflow of other jet streams. For example, in the direction of forward or backward movement, when the volume of the airflow of the jet streams in the front-end outlet direction is adjusted to be smaller than the volume of the airflow of the jet streams in the back-end outlet direction, the unmanned aerial vehicle will move forwardly; when the volume of the airflow of the jet streams in the back-end outlet direction is adjusted to be smaller than the volume of the airflow of the jet streams in the front-end outlet direction, the unmanned aerial vehicle will move backwardly.

Detailed descriptions of the invention are disclosed below with a number of embodiments. However, the disclosed embodiments are for explanatory and exemplary purposes only, not for limiting the scope of protection of the invention.

Figure 2:
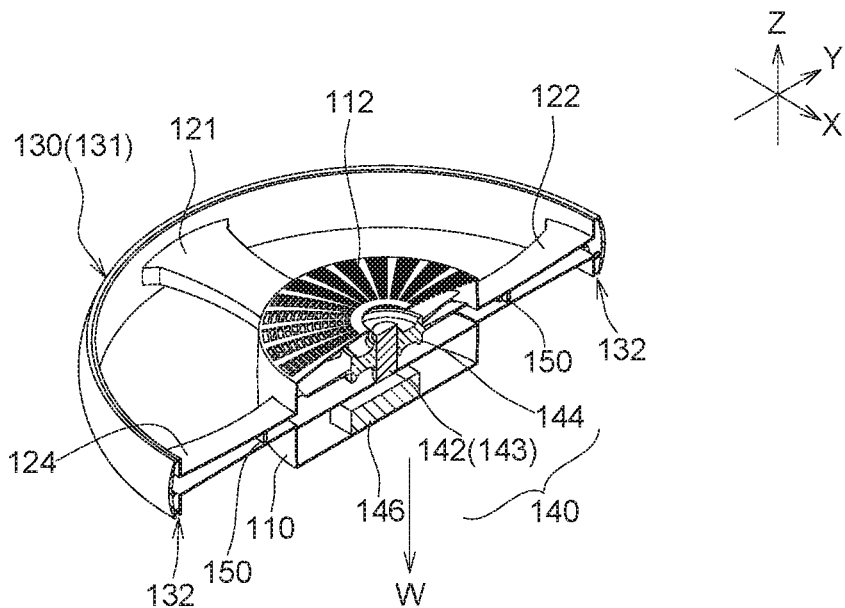
FIG. 2 is a cross-sectional view of the unmanned aerial vehicle of FIG. 1 along a cross-sectional line B-B.
Figure 3:
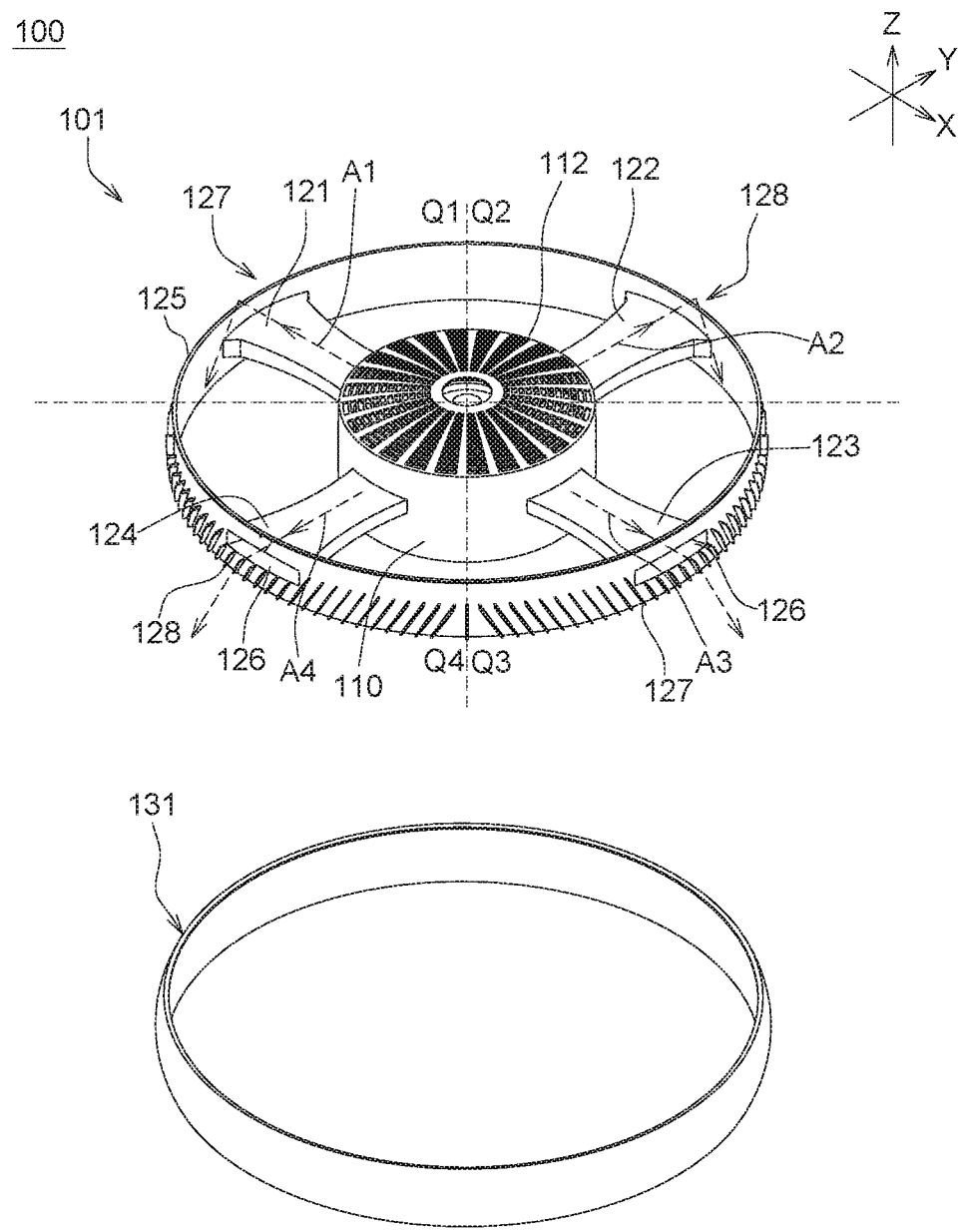
FIG. 3 is an explosion diagram of the airflow guiding structure of the unmanned aerial vehicle of FIG. 1.

Refer to FIGS. 1, 2 and 3. The unmanned aerial vehicle 100 according to an embodiment of the invention includes a vehicle body 101, an airflow thruster 140 and a plurality of airflow controllers 150. The center of the vehicle body 101 has a center hub 110, and the airflow thruster 140 is disposed inside the center hub 110. Moreover, a control device 146, such as a receiver, and a battery can be disposed inside the center hub 110. The receiver receives a control signal from the exterior for controlling each airflow controller 150. The battery provides a necessary power for the airflow thruster 140. In practical applications, the user controls the unmanned aerial vehicle 100 through a wireless joystick or a handheld wireless electronic device or specifies a destination through a positioning system, such that the unmanned aerial vehicle 100 can fly to the destination directly. Meanwhile, a camera can be configured on the unmanned aerial vehicle 100 to perform tasks such as monitoring or aerial photography.

In an embodiment, the top of the center hub 110 can be a grille having an airflow inlet 112 allowing the inlet gas $A_{in}$ to pass through. The grille can avoid foreign matters entering the center hub 110 and affecting the normal operation of the airflow thruster 140. The inlet gas $A_{in}$, such as the air, can be pressurized by the airflow thruster 140 to form a plurality of jet streams A1-A4. Then, the jet streams A1-A4 can be guided by the airflow guiding structure 120 to be ejected via different outlet directions and used as a power source of the unmanned aerial vehicle 100.

In FIG. 2, the airflow thruster 140 includes an electric motor 142 and a vane assembly 144 (or propellers). The center of the electric motor 142 has a shaft 143 on which the vane assembly 144 is disposed. The electric motor 142 drives the vane assembly 144 to rotate and generate the jet streams A1 A4. The vane assembly 144, such as a pressure centrifugal impeller, pressurizes the inlet gas $A_{in}$ passing through the airflow inlet 112. The inlet gas $A_{in}$ enters the center hub 110 in a direction parallel to the axial direction of the center hub 110 (the Z-axis direction), and is pressurized by the vane assembly 144 to form the jet streams A1-A4 flowing towards the radial direction of the center hub 110 (perpendicular to the Z-axis direction).

Furthermore, the vehicle body 101 has an airflow guiding structure 120 and an outer circumferential portion 130. The annular plate 131 is disposed on the outer circumferential portion 130. An interior of the airflow guiding structure 120 is interconnected between the center hub 110 and the outer circumferential portion 130. The airflow guiding structure 120 guides the inlet gas $A_{in}$ to enter the outer circumferential portion 130 via each of the channels 121-124.

In an embodiment, the airflow guiding structure 120 has four channels 121-124, but the invention is not limited thereto. The first channel 121 and the third channel 123 are located on the first axis X, the second channel 122 and the fourth channel 124 are located on the second axis Y, and the first axis X and the second axis Y intersect at the center line of the center hub 110. That is, each of the channels 121-124 extends to the outer circumferential portion 130 in a radial direction of the center hub 110 (that is, extends in a direction perpendicular to the central axis) to generate a first jet stream A1, a second jet stream A2, a third jet stream A3 and a fourth jet stream A4 having four different directions.

In FIG. 3, the airflow guiding structure 120 has an outer circumferential surface 125. The four channels 121-124 have four openings 126 on the outer circumferential surface 125. The four openings 126 allow the jet streams A1-A4 to pass through, such that jet streams A1-A4 substantially enter the outer circumferential portion 130 in the form of horizontal flow.

Figure 4:
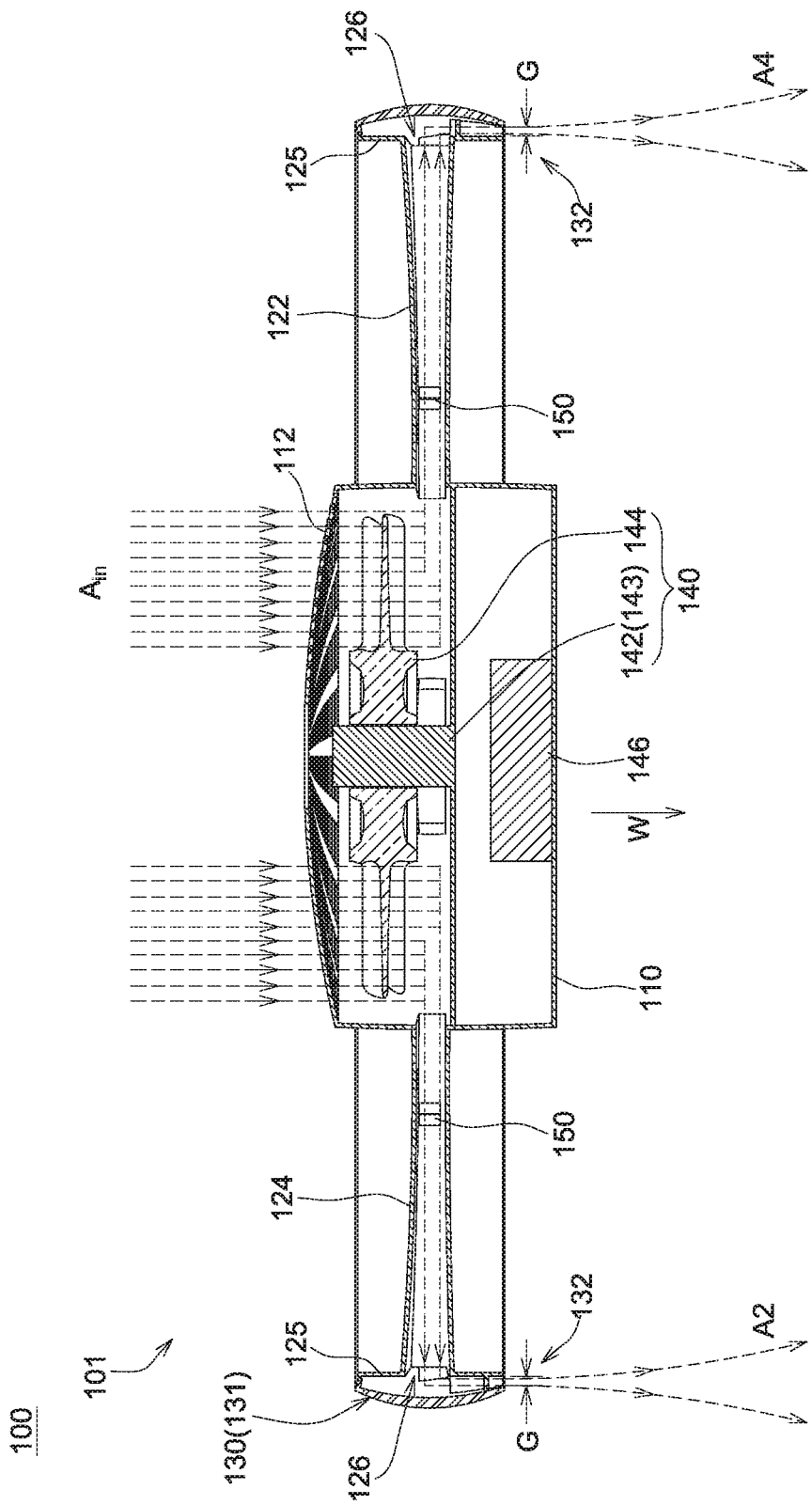
FIG. 4 is a cross-sectional view of the airflow guiding structure of the unmanned aerial vehicle.
Figures 1, 4:
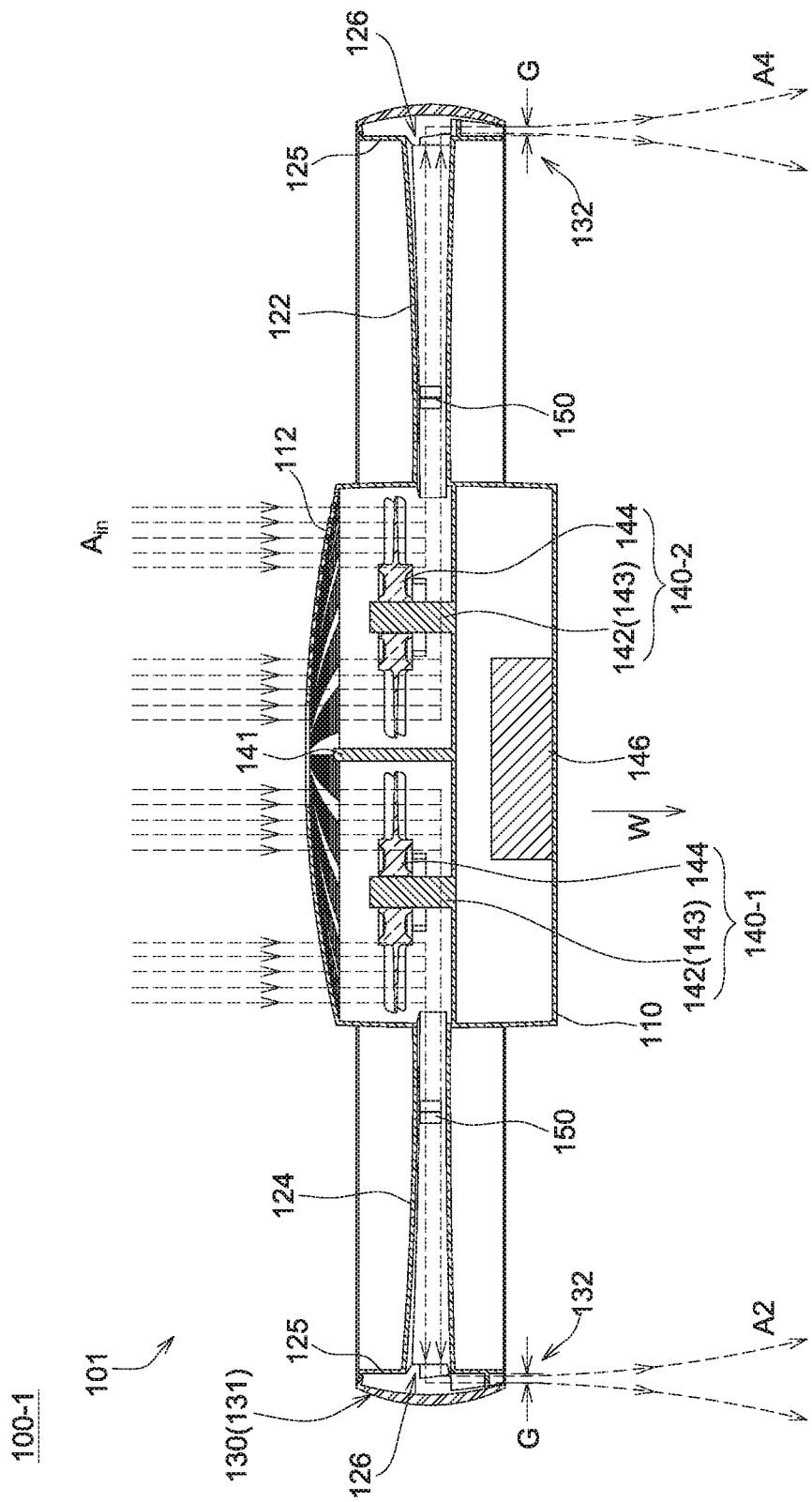

Refer to FIGS. 2, 3 and 4. The outer circumferential portion 130 has two lateral guiding outlets 132 on the first axis X, and the outer circumferential portion 130 has two lateral guiding outlets 132 on the second axis Y, but the invention is not limited thereto. Each lateral guiding outlet 132 faces downward and corresponds to a gravity direction W of the unmanned aerial vehicle 100. That is, the corresponding direction of the lateral guiding outlets 132 (the gravity direction W) is substantially perpendicular to the extending direction of each of the channels 121-124. Furthermore, the outer circumferential portion 130 has an annular plate 131 covering the outer circumferential surface 125 of the airflow guiding structure 120, and the annular plate 131 and the outer circumferential surface 125 are separated by a gap G on a bottom side thereof. The annular plate 131 guides the jet streams A1-A4 passing through the openings 126 to flow towards the gravity direction W of the unmanned aerial vehicle 100 and to eject off the lateral guiding outlets 132 via the gap G on a bottom side.

Refer to FIG. 3. In an embodiment, the outer circumferential surface 125 is divided into four quadrants Q1-Q4 using the center hub 110 as the center, and four channels 121-124 are respectively located in the four quadrants Q1-Q4. In the first quadrant Q1 and the third quadrant Q3 respectively, the outer circumferential surface 125 has a first oblique wind grille 127, such as tilting to the bottom right from the top left, for guiding the jet streams A1 and A3 to generate a first oblique stream. In the second quadrant Q2 and the fourth quadrant Q4 respectively, the outer circumferential surface 125 has a second oblique wind grille 128, such as tilting to the bottom left from the top right, for guiding the jet streams A2 and A4 to generate a second oblique stream. In other words, the two jet streams A1 and A3 located on the first axis X are guided by the annular plate 131 and the first oblique wind grille 127 located in the first quadrant Q1 and the third quadrant Q3 (the quantity of the first oblique wind grille 127 is not specified, for example, ranges between 20-30) to tilt to the bottom right and generate a first oblique stream; the two jet streams A2 and A4 located on the second axis Y are guided by the annular plate 131 and the second oblique wind grille 128 located in the second quadrant Q2 and the fourth quadrant Q4 (the quantity of the second oblique wind grille 128, for example, ranges between 20-30) to tilt to the bottom left and generate the second oblique stream. The first oblique stream and the second oblique airflow are arranged alternately on the outer circumferential surface 125. The quantity of oblique airflows is not limited to four. For example, the quantity of oblique airflows can be six, eight or even more. The first oblique wind grille 127 and the second oblique wind grille 128 can be arranged symmetrically or non-symmetrically with respect to the Z-axis, and the invention does not have specific restriction regarding to the said arrangement.

Refer to FIG. 4. In an embodiment, the unmanned aerial vehicle 100 can control the propulsion of the jet streams A1-A4 in each of the outlet directions by using the airflow controllers 150. The propulsion of the jet streams A1-A4 has much to do with the volume of the airflow passing through each of the channels 121-124 per time unit, and the volume of the airflow (or the propulsion force) has much to do with relation to the pressure difference caused by the rotation speed, vane shape and vane size of the airflow thruster 140 in the center hub 110, and the larger the pressure difference, the larger the propulsion force. For example, the airflow controllers 150 can adjust the aperture of the electronic valve to change the volume of the airflow in each of the channels 121-124, and the propulsion of the jet streams A1-A4 in the channels 121-124 can be obtained by calculating the volume of the airflow passing through each of the channels 121-124 per time unit.

In an embodiment, when the propulsions of the first jet stream A1 and the third jet stream A3 on the first axis X are equivalent to each other and the propulsions of the second jet stream A2 and the fourth jet stream A4 on the second axis Y are also equivalent to each other, the unmanned aerial vehicle 100 will have dynamic balance on the first axis X and the second axis Y, and will move only along a third axis Z perpendicular to the first axis X and the second axis Y (such as ascend or descend along the third axis Z).

Refer to FIG. 4-1. In the unmanned aerial vehicle 100-1 of another embodiment, a plurality of airflow thrusters 140-1 and 140-2, such as 2, 3 or 4 airflow thrusters, are disposed inside the center hub 110. The airflow thrusters 140-1 and 140-2 can be separated by a partition board 141 to form multiple spaces. When the quantity of airflow thrusters is equivalent to 2, each airflow thruster can generate two jet streams in two corresponding channels. When the quantity of airflow thrusters is equivalent to 3 or 4, each airflow thruster can generate a jet stream in one corresponding channel or two corresponding channels. In an embodiment, when the quantity of airflow thrusters is equivalent to 4, and the quantity of channels is also equivalent to 4, the volume of the airflow inside each of the channels 121-124 can be controlled by independent airflow thrusters or controlled by the airflow controllers 150 inside each of the channels 121-124.

Figure 5A:
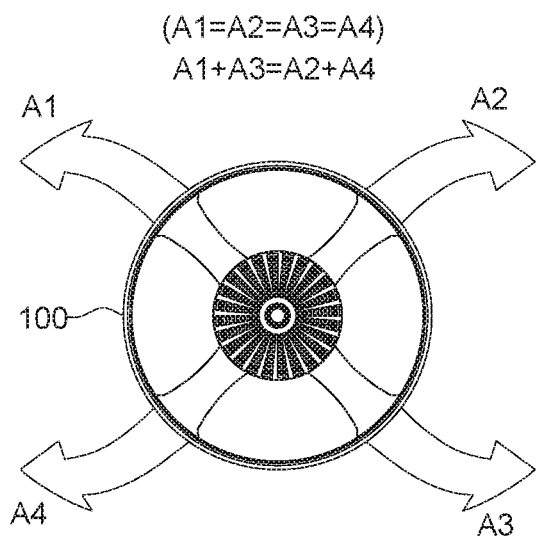
FIG. 5A is a distribution diagram of the jet streams in each outlet direction of the unmanned aerial vehicle.
Figure 5B:
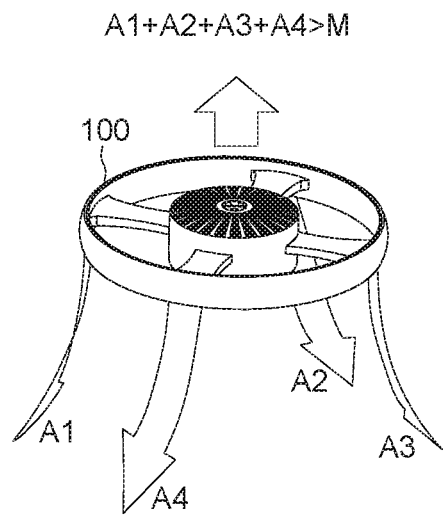
FIGS. 5B-5D are schematic diagrams of controlling the jet streams in each outlet direction such that the unmanned aerial vehicle ascends, descends and hovers.
Figure 5C:
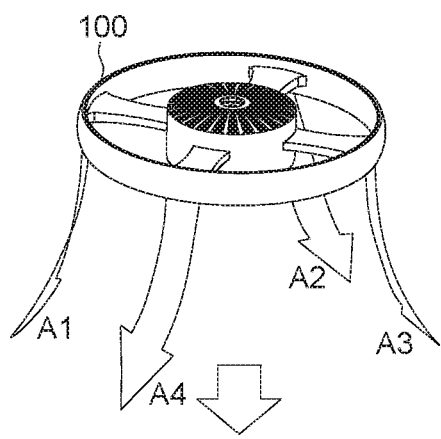
Figure 5D:
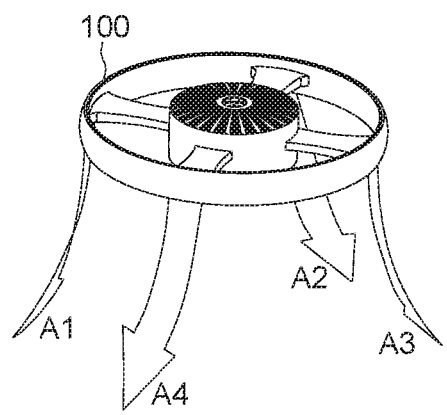

As indicated in FIG. 5A, when the propulsions generated by the first jet stream A1, the second jet stream A2, the third jet stream A3 and the fourth jet stream A4 are equivalent to each other (that is, A1=A2=A3=A4) and the propulsions of the first oblique stream (that is, the first jet stream A1 and the third jet stream A3) and the second oblique stream (that is, the second jet stream A2 and the fourth jet stream A4) are substantially equivalent to each other, the clockwise rotation propulsion is equivalent to the anti-clockwise rotation propulsion, so the unmanned aerial vehicle 100 will not rotate. In FIG. 5B, when the propulsions generated by the first to the fourth jet streams A1-A4 are greater than the gravity M of the unmanned aerial vehicle 100 (that is, A1+A2+A3+A4>M), the unmanned aerial vehicle 100 ascends. In FIG. 5C, when the propulsions generated by the first to the fourth jet streams A1-A4 are smaller than the gravity M of the unmanned aerial vehicle 100 (that is, A1+A2+A3+A4<M), the unmanned aerial vehicle 100 descends. In FIG. 5D, when the propulsions generated by the first to the fourth jet streams A1-A4 are equivalent to the gravity M of the unmanned aerial vehicle 100 (that is, A1+A2+A3+A4=M), the unmanned aerial vehicle 100 hovers.

Figure 6A:
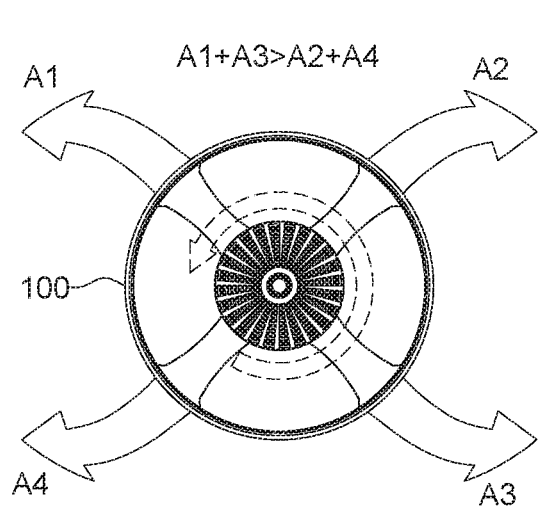
FIGS. 6A and 6B are schematic diagrams of controlling the jet streams in each outlet direction such that the unmanned aerial vehicle rotates anti-clockwise.
Figure 6B:
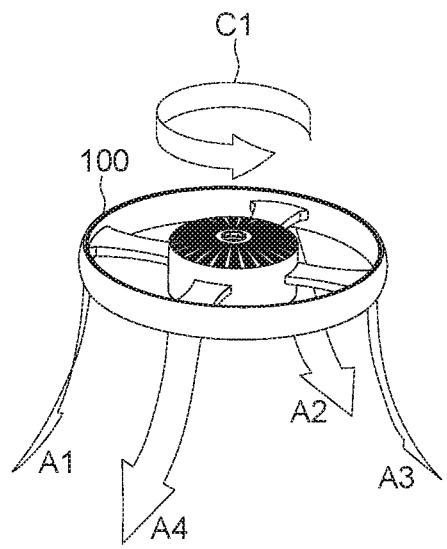
Figure 7A:
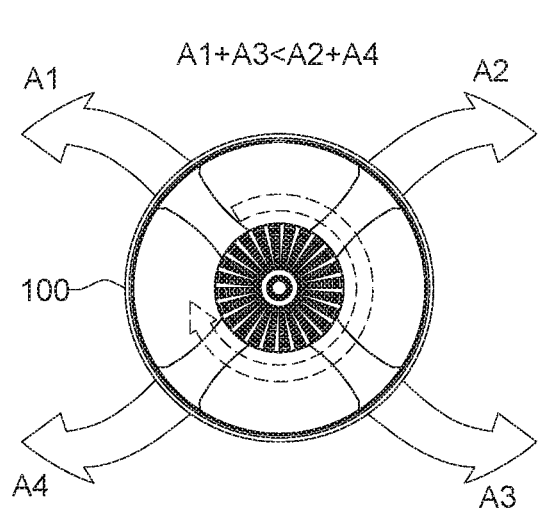
FIGS. 7A and 7B are schematic diagrams of controlling the jet streams in each outlet direction such that the unmanned aerial vehicle rotates clockwise.
Figure 7B:
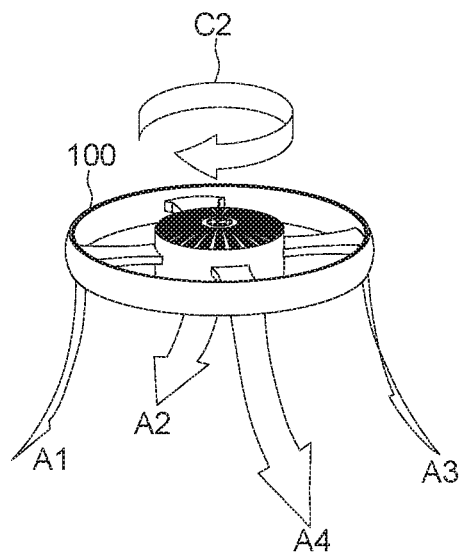

Refer to FIGS. 6A and 6B, In an embodiment, when the propulsions generated by the first oblique stream (that is, the first jet stream A1 and the third jet stream A3) are greater than the propulsions generated by the second oblique stream (that is, the second jet streams A2 and the fourth jet streams A4) (that is, A1+A2>A3+A4), the unmanned aerial vehicle 100 rotates in a first rotation direction C1. For example, the unmanned aerial vehicle 100 rotates anti-clockwise. Refer to FIGS. 7A and 7B. In an embodiment, when the propulsions generated by the first oblique stream (that is, the first jet stream A1 and the third jet stream A3) are smaller than the propulsions generated by the second oblique stream (that is, the second jet stream A2 and the fourth jet stream A4) (that is, A1+A3<A2+A4), the unmanned aerial vehicle 100 rotates in a second rotation direction C2. For example, the unmanned aerial vehicle 100 rotates clockwise.

Figure 8A:
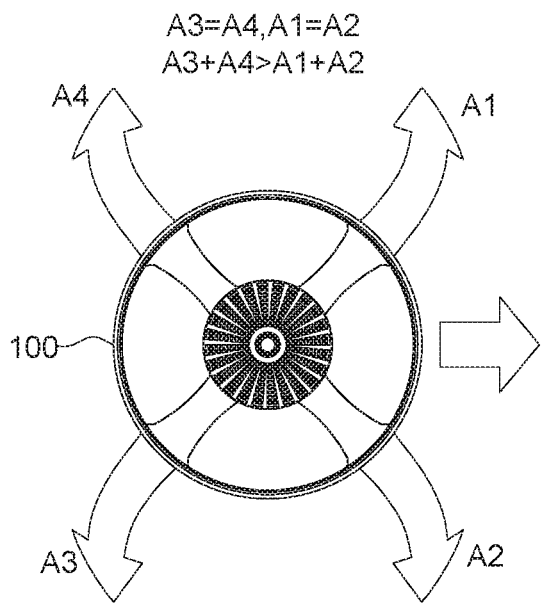
FIGS. 8A and 8B are schematic diagrams of controlling the jet streams in each outlet direction such that the unmanned aerial vehicle moves forwardly.
Figure 8B:
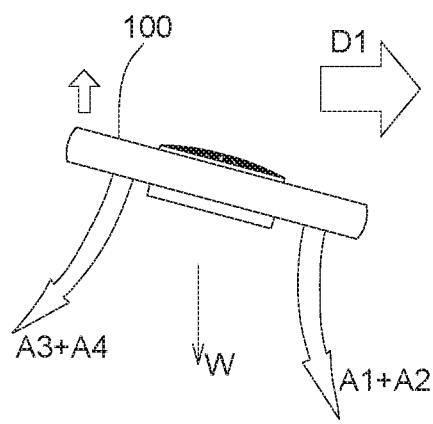

Refer to FIGS. 8A and 8B. When the propulsion generated by the first jet stream A1 is equivalent to the propulsion generated by the second jet stream A2 and the propulsion generated by the third jet stream A3 is equivalent to the propulsion generated by the fourth jet stream A4, the propulsions generated by the first oblique stream is equivalent to the propulsions generated by the second oblique stream and the unmanned aerial vehicle 100 does not rotate. When the propulsions generated by the first jet stream A1 and the second jet stream A2 are smaller than the propulsions generated by the third jet stream A3 and the fourth jet stream A4 (that is, A3+A4>A1+A2), the unmanned aerial vehicle 100 tilts towards a first direction D1 on one side of the unmanned aerial vehicle 100 having a smaller propulsion. For example, the unmanned aerial vehicle 100 tilts to the right. Since the unmanned aerial vehicle 100 tilts to one side, the four jet streams A1-A4, which originally eject in a direction towards the gravity direction W, change to eject in a direction oblique to the bottom left instead of the gravity direction W to generate a rightward propulsion and drive the unmanned aerial vehicle 100 to move horizontally in the first direction D1. For example, the unmanned aerial vehicle 100 moves forwardly. In an embodiment, once the propulsions generated by four jet streams A1-A4 are equivalent to each other, the unmanned aerial vehicle 100 can resume the hovering state and no more move horizontally.

Figure 9A:
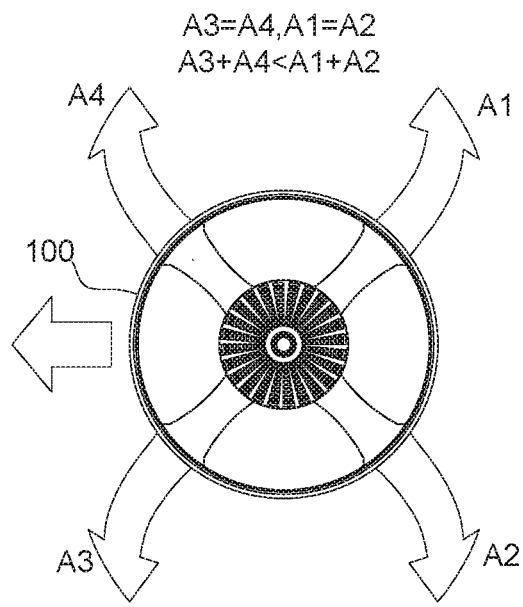
FIGS. 9A and 9B are schematic diagrams of controlling the jet streams in each outlet direction such that the unmanned aerial vehicle moves backwardly.
Figure 9B:
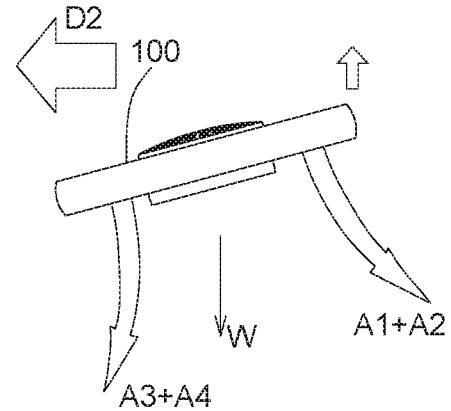

Refer to FIGS. 9A and 9B. When the propulsion generated by the first jet stream A1 and the second jet stream A2 is greater than the propulsion generated by the third jet stream A3 and the fourth jet stream A4 (that is, A3+A4<A1+A2), the unmanned aerial vehicle 100 tilts towards a second direction D2 on another side of the unmanned aerial vehicle 100 having a smaller propulsion. Since the unmanned aerial vehicle 100 tilts to one side, the four jet streams A1-A4, which originally eject in a direction towards the gravity direction W, change to eject in a direction oblique to the bottom right instead of the gravity direction W to generate a leftward propulsion and drive the unmanned aerial vehicle 100 to move horizontally in the second direction D2. For example, the unmanned aerial vehicle 100 moves backwardly.

Thus, as long as the jet streams in each outlet direction can be controlled to be equivalent to or different from other such that the vehicle body can remain horizontal or tilt to one side, the unmanned aerial vehicle can be controlled to ascend, descend, hover, rotate to the right, rotate to the left or move horizontally. In other embodiments, by changing the direction or other characteristics of the airflow, the unmanned aerial vehicle can further perform flip-over, oblique flight or other flight modes, and the invention does not have specific restrictions regarding the flight mode.

According to the unmanned aerial vehicle disclosed in above embodiments of the invention, the vanes or rotors are not exposed outside the vehicle body, not only providing higher security but further avoiding the rotors causing damages to the people or objects in the vicinity thereof when the rotor rotate at a high speed. Moreover, since both the quantity of rotors and the quantity of motors are reduced, the overall weight is reduced. The unmanned aerial vehicle of the invention uses the central airflow to generate radial jet streams, hence reducing the interference between the airflows and avoiding the generated airflows being affected by external airflows. Furthermore, the outlet directions can be changed through the airflow guiding elements disposed at the channels outlets (such as guiding groove, orifice plate, grille or rib plate) to generate the first oblique stream and the second oblique stream having different directions and rotate the unmanned aerial vehicle, such that the stability of the unmanned aerial vehicle can be increased and the risk of the unmanned aerial vehicle dropping off can be reduced.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An unmanned aerial vehicle, comprising:
a vehicle body having a center hub, an airflow guiding structure and an outer circumferential portion, wherein an interior of the airflow guiding structure is interconnected between the center hub and the outer circumferential portion, the center hub has an airflow inlet, and the outer circumferential portion has a plurality of lateral guiding outlets facing downward and corresponding to a gravity direction of the unmanned aerial vehicle; and
an airflow thruster disposed inside the center hub for generating a plurality of jet streams which flow to the lateral guiding outlets through the airflow guiding structure to generate a propulsion, wherein the airflow thruster comprises an electric motor and a vane assembly, and the electric motor drives the vane assembly to rotate and generate the jet streams; when the propulsion of the jet streams is greater than the gravity of the unmanned aerial vehicle, the unmanned aerial vehicle ascends; when the propulsion of the jet streams is smaller than the gravity of the unmanned aerial vehicle, the unmanned aerial vehicle descends; when the propulsion of the jet streams is equivalent to the gravity of the unmanned aerial vehicle, the unmanned aerial vehicle hovers;
wherein the vane assembly is a pressure centrifugal impeller for pressurizing an inlet gas passing through the airflow inlet in a direction parallel to an axial direction of the center hub to form the jet streams flowing towards a radial direction of the center hub.

2. The unmanned aerial vehicle according to claim 1, wherein the airflow guiding structure has N channels, N is an even number greater than 1; when N is equivalent to 4, the first channel and the third channel are located on a first axis, the second channel and the fourth channel are located on a second axis, and the first axis and the second axis intersect at center line of the center hub.

3. The unmanned aerial vehicle according to claim 2, wherein the airflow guiding structure has an outer circumferential surface on which the N channels have N openings for the jet streams to pass through.

4. The unmanned aerial vehicle according to claim 3, wherein the outer circumferential portion of the vehicle body has an annular plate covering the outer surface of the airflow guiding structure, the annular plate and the outer circumferential surface are separated by a gap on a bottom side, the annular plate guides the jet streams passing through the openings to flow towards the gravity direction of the unmanned aerial vehicle and to eject off the lateral guiding outlets via the gap on the bottom side.

5. The unmanned aerial vehicle according to claim 2, further comprising N airflow controllers respectively disposed in the N channels for controlling the propulsion of the jet streams in each of the channels.

6. The unmanned aerial vehicle according to claim 5, wherein the outer circumferential surface is divided into four quadrants using the center hub as a center, and when N is equivalent to 4, the four channels are respectively located in the four quadrants; in the first quadrant and the third quadrant respectively, the outer circumferential surface has a first oblique wind grille for guiding the jet streams to generate a first oblique stream; in the second quadrant and the fourth quadrant respectively, the outer surface has a second oblique wind grille for guiding the jet streams to generate a second oblique stream,
wherein, when the propulsion generated by the first oblique stream is greater than the propulsion generated by the second oblique stream, the unmanned aerial vehicle rotates along a first rotation direction; when the propulsion generated by the first oblique stream is smaller than the propulsion generated by the second oblique stream, the unmanned aerial vehicle rotates along a second rotation direction inverse to the first rotation direction; when the propulsion generated by the first oblique stream is equivalent to the propulsion generated by the second oblique stream, the unmanned aerial vehicle does not rotate.

7. The unmanned aerial vehicle according to claim 6, wherein the first oblique wind grille and the second oblique wind grille are arranged symmetrically.

8. The unmanned aerial vehicle according to claim 5, wherein the outer circumferential surface is divided into four quadrants around the center hub, and when N is equivalent to 4, the four channels are respectively located in the four quadrants; in the first quadrant to the fourth quadrant, the jet streams generate a first jet stream, a second jet stream, a third jet stream and a fourth jet stream respectively,
wherein, when the propulsion generated by the first jet stream and the second jet stream is smaller than the propulsion generated by the third jet stream and the fourth jet stream, the unmanned aerial vehicle tilts towards a first direction on a side of the vehicle body having a smaller propulsion, such that the jet streams eject in a direction oblique to the gravity direction of the unmanned aerial vehicle and drive the unmanned aerial vehicle to move horizontally along the first direction; when the propulsion generated by the first jet stream and the second jet stream is greater than the propulsion generated by the third jet stream and the fourth jet stream, the unmanned aerial vehicle tilts towards a second direction on another side of the vehicle body having a smaller propulsion, such that the jet streams eject in a direction oblique to the gravity direction of the unmanned aerial vehicle and drive the unmanned aerial vehicle to move horizontally along the second direction inverse to the first direction; when the propulsion generated by the first jet stream and the second jet stream is equivalent to the propulsion generated by the third jet stream and the fourth jet stream, the unmanned aerial vehicle hovers.

9. The unmanned aerial vehicle according to claim 5, wherein each airflow controller is an electronic valve or a controller having the electronic valve, and an aperture of the electronic valve is adjusted to control the propulsion of the jet streams at the lateral guiding outlets.

10. The unmanned aerial vehicle according to claim 1, wherein the quantity of the airflow thruster is greater than one, and each airflow thruster correspondingly generates at least one of the jet streams.

11. A control method of an unmanned aerial vehicle, comprising:
generating a plurality of jet streams which flow to lateral guiding outlets of the unmanned aerial vehicle to generate a propulsion;
wherein from a first quadrant to a fourth quadrant, the jet streams are a first jet stream, a second jet stream, a third jet stream and a fourth jet stream, respectively,
wherein, when the propulsion generated by the first jet stream and the second jet stream is smaller than the propulsion generated by the third jet stream and the fourth jet stream, the unmanned aerial vehicle tilts towards a first direction on a side of the vehicle body having a smaller propulsion, such that the jet streams eject in a direction oblique to the gravity direction of the unmanned aerial vehicle and drive the unmanned aerial vehicle to move horizontally along the first direction; when the propulsion generated by the first jet stream and the second jet stream is greater than the propulsion generated by the third jet stream and the fourth jet stream, the unmanned aerial vehicle tilts towards a second direction on another side of the vehicle body having a smaller propulsion, such that the jet streams eject in a direction oblique to the gravity direction of the unmanned aerial vehicle and drive the unmanned aerial vehicle to move horizontally along the second direction inverse to the first direction; when the propulsion generated by the first jet stream and the second jet stream is equivalent to the propulsion generated by the third jet stream and the fourth jet stream, the unmanned aerial vehicle hovers,
wherein the jet streams are generated by a pressure centrifugal impeller pressurizing an inlet gas passing through an airflow inlet of the unmanned aerial vehicle in a direction parallel to an axial direction of an center hub of the unmanned aerial vehicle to flow towards a radial direction of the center hub.

12. The control method according to claim 11, wherein the jet streams generate a first oblique stream in the first quadrant and the third quadrant respectively, and generate a second oblique stream in the second quadrant and the fourth quadrant respectively;
wherein when the propulsion generated by the first oblique stream is greater than the propulsion generated by the second oblique stream, the unmanned aerial vehicle rotates along a first rotation direction; when the propulsion generated by the first oblique stream is smaller than the propulsion generated by the second oblique stream, the unmanned aerial vehicle rotates along a second rotation direction inverse to the first rotation direction; when the propulsion generated by the first oblique stream is equivalent to the propulsion generated by the second oblique stream, the unmanned aerial vehicle does not rotate.

13. The control method according to claim 11, wherein the unmanned aerial vehicle has an outer circumferential surface divided into four quadrants, and the jet streams are respectively located in the four quadrants; in the first quadrant and the third quadrant respectively, the outer circumferential surface has a first oblique wind grille for guiding the jet streams to generate a first oblique stream; in the second quadrant and the fourth quadrant respectively, the outer surface has a second oblique wind grille for guiding the jet streams to generate a second oblique stream,
wherein, when the propulsion generated by the first oblique stream is greater than the propulsion generated by the second oblique stream, the unmanned aerial vehicle rotates along a first rotation direction; when the propulsion generated by the first oblique stream is smaller than the propulsion generated by the second oblique stream, the unmanned aerial vehicle rotates along a second rotation direction inverse to the first rotation direction; when the propulsion generated by the first oblique stream is equivalent to the propulsion generated by the second oblique stream, the unmanned aerial vehicle does not rotate.

14. The control method according to claim 13, wherein the first oblique wind grille and the second oblique wind grille are arranged symmetrically.

* * * * *